(12) United States Patent  
Bergevin et al.

(10) Patent No.: US 8,991,125 B2  
(45) Date of Patent: Mar. 31, 2015

(54) ASSEMBLY KEY, DOOR KITS AND METHODS OF USING THE SAME

(75) Inventors: Louis Bergevin, Notre-Dame-de-l'Île-Perrot (CA); Yvan Bergevin, Vaudreuil (CA); Annie Lajeunesse, Hudson (CA)

(73) Assignee: Nuco Systems inc., Vaudreuil-Dorion, QC (CA)

( * ) Notice: Subject to any disclaimer, the term of this patent is extended or adjusted under 35 U.S.C. 154(b) by 0 days.

(21) Appl. No.: 13/989,701

(22) PCT Filed: Oct. 7, 2011

(86) PCT No.: PCT/CA2011/001134  
§ 371 (c)(1),  
(2), (4) Date: Aug. 7, 2013

(87) PCT Pub. No.: WO2012/068666  
PCT Pub. Date: May 31, 2012

(65) Prior Publication Data  
US 2013/0312351 A1    Nov. 28, 2013

Related U.S. Application Data

(63) Continuation of application No. 12/954,745, filed on Nov. 26, 2010, now abandoned.

(51) Int. Cl.  
*E06B 3/70* (2006.01)  
*E06B 3/72* (2006.01)  
*F16B 12/12* (2006.01)  
*E06B 3/74* (2006.01)  
*E06B 3/984* (2006.01)

(52) U.S. Cl.  
CPC ................ *E06B 3/72* (2013.01); *F16B 12/125* (2013.01); *E06B 3/74* (2013.01); *E06B 3/984* (2013.01); *A47B 2230/0062* (2013.01); *A47B 2230/0077* (2013.01); *E06B 2003/7013* (2013.01)  
USPC ............................... 52/458; 52/656.4; 49/501

(58) Field of Classification Search  
USPC ......... 52/455, 456, 457, 458, 656.9, 204.597, 52/656.4, 656.7, 656.5; 403/294, 381; 49/501, 503, 381, 382, 399  
See application file for complete search history.

(56) References Cited

U.S. PATENT DOCUMENTS 560,697 A * 5/1896 Dustin .......................... 292/170  
713,679 A * 11/1902 Pfeil et al. ..................... 403/294  
1,570,427 A * 1/1926 Bie .................................. 52/27

(Continued)

FOREIGN PATENT DOCUMENTS

DE      3800636     9/1988  
GB      859494      1/1961

OTHER PUBLICATIONS

PCT—International Preliminary Examining Authority (IPRP)—PCT/CA2011/001134 (Form PCT/IPEA/416)—Apr. 2, 2013—4 pages.

(Continued)

*Primary Examiner* — James Ference  
(74) *Attorney, Agent, or Firm* — Benoît & Côté Inc.

(57) ABSTRACT

A key of the present invention is for releasably connecting members, furniture and door assembly kits comprising keys, and members having mating connectors along their ends for releasably connecting the members through their mating connectors.

11 Claims, 15 Drawing Sheets

(56) References Cited

U.S. PATENT DOCUMENTS

| | | | | |
|---|---|---|---|---|
| 1,694,522 | A | * | 12/1928 | Victor .......................... 52/784.1 |
| 2,407,927 | A | * | 9/1946 | Hayden ........................ 446/125 |
| 2,735,146 | A | * | 2/1956 | Purviance ................... 403/294 |
| 2,735,147 | A | * | 2/1956 | Nielsen ........................ 249/205 |
| 2,825,099 | A | * | 3/1958 | Simmons ........................ 52/455 |
| 4,060,437 | A | * | 11/1977 | Strout ............................. 156/71 |
| 4,275,972 | A | * | 6/1981 | Bowen et al. ................. 403/401 |
| 4,632,589 | A | * | 12/1986 | Hsiu .............................. 403/24 |
| 4,934,765 | A | * | 6/1990 | Slifer et al. ................... 312/258 |
| 5,090,835 | A | * | 2/1992 | Cox .............................. 403/294 |
| 5,179,810 | A | * | 1/1993 | Gename et al. ................. 52/240 |
| 5,218,807 | A | * | 6/1993 | Fulford ........................... 52/455 |
| 5,423,149 | A | * | 6/1995 | Herbst ............................ 49/382 |
| 5,469,903 | A | * | 11/1995 | Stanley ......................... 144/345 |
| 5,531,539 | A | * | 7/1996 | Crawford ..................... 403/381 |
| 5,584,154 | A | * | 12/1996 | Koepke et al. ................. 52/456 |
| 5,704,177 | A | * | 1/1998 | Wirkus et al. .................. 52/308 |
| 5,730,544 | A | * | 3/1998 | Dils et al. ..................... 403/292 |
| 5,771,656 | A | * | 6/1998 | Amoretti ..................... 52/745.14 |
| 5,775,041 | A | * | 7/1998 | Tull et al. ....................... 52/455 |
| 5,799,452 | A | * | 9/1998 | Moore ............................ 52/233 |
| 5,848,505 | A | * | 12/1998 | Taylor ............................ 52/202 |
| 6,067,699 | A | * | 5/2000 | Jackson .......................... 29/430 |
| 6,185,894 | B1 | * | 2/2001 | Sisco et al. ..................... 52/457 |
| 6,186,691 | B1 | * | 2/2001 | Rudolf-Bauer ................ 403/31 |
| 6,487,827 | B2 | * | 12/2002 | Hollman ........................ 52/455 |
| 6,513,558 | B1 | * | 2/2003 | Chen ............................ 144/345 |
| 6,684,590 | B2 | * | 2/2004 | Frumkin ........................ 52/456 |
| 6,874,291 | B1 | * | 4/2005 | Weber ........................ 52/586.1 |
| 7,143,561 | B2 | * | 12/2006 | Hollman ........................ 52/456 |
| 8,147,162 | B1 | * | 4/2012 | Burnett et al. ................ 403/292 |
| 2005/0210797 | A1 | * | 9/2005 | Hees .............................. 52/455 |
| 2006/0150524 | A1 | * | 7/2006 | Kibbel et al. ................... 49/501 |
| 2006/0254175 | A1 | * | 11/2006 | Thun .............................. 52/455 |
| 2006/0283121 | A1 | * | 12/2006 | Graboyes ....................... 52/455 |
| 2007/0039270 | A1 | * | 2/2007 | Hollman ........................ 52/456 |
| 2007/0107349 | A1 | * | 5/2007 | Erker ............................. 52/455 |
| 2010/0154340 | A1 | * | 6/2010 | Schiedegger et al. .......... 52/473 |
| 2010/0236168 | A1 | * | 9/2010 | Gosse ............................ 52/213 |
| 2011/0203753 | A1 | * | 8/2011 | Domingue et al. .......... 160/378 |
| 2012/0133253 | A1 | * | 5/2012 | Bergevin et al. .............. 312/204 |

OTHER PUBLICATIONS

PCT/International Search Report (ISR)—PCT/CA2011/001134 (Form PCT/ISA/220)—Jan. 30, 2012—3 pages.

* cited by examiner

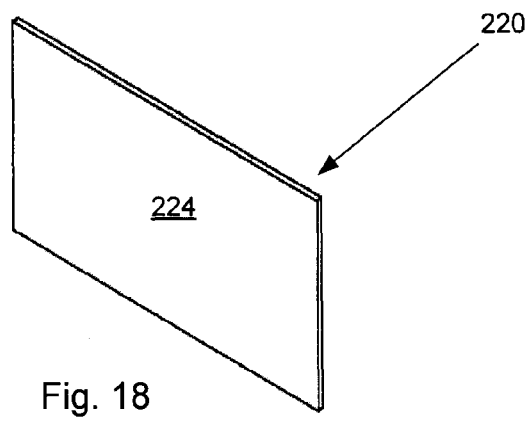
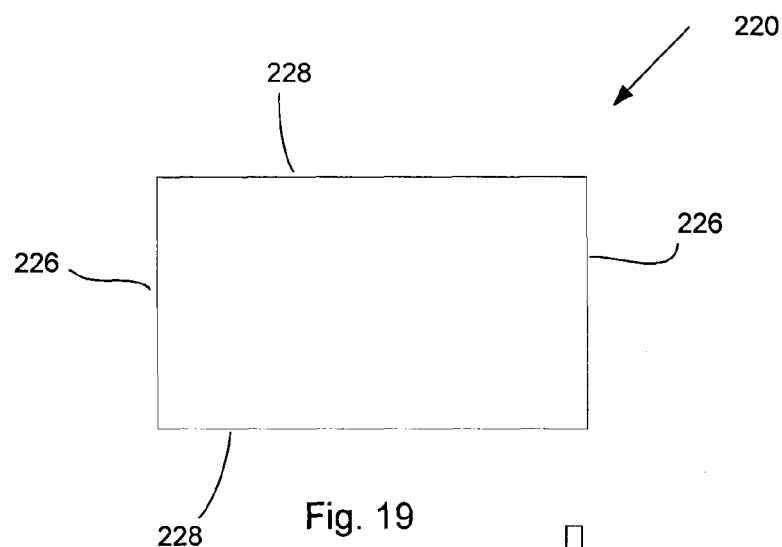
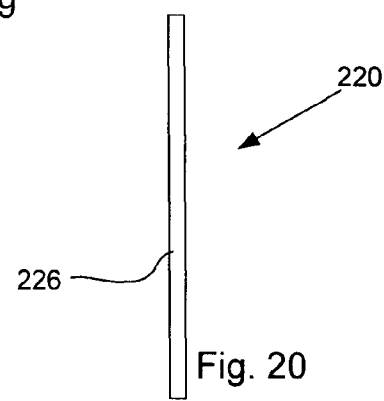

ASSEMBLY KEY, DOOR KITS AND METHODS OF USING THE SAME

CROSS-REFERENCE TO RELATED APPLICATIONS

This application claims priority under 35 USC §119(e) of U.S. patent application Ser. No. 12/954,745, filed on Nov. 26, 2010, the specification of which is hereby incorporated by reference.

BACKGROUND (a) Field

This invention relates to the field of building materials. More particularly, it relates to a key for releasably connecting members, and to a door assembly kit comprising keys and members releasably connecting to form a door assembly.

(b) Related Prior Art

The assembly of building materials is a challenging endeavour which is facilitated by specialized machinery and tools in industrial and manufacturing settings. However, such assembly remains difficult when performed in a household setting, especially by non-professional individuals.

When a customer purchases furniture or other household material, they may be provided unassembled or only partially assembled, and the assembly of such material usually involves fasteners (e.g. screws, nails, and the like), and adhesives (e.g. glues). The assembly of furniture or material may require other means of assembly which are not normally available to the end purchaser of the products due to their specialized nature. For example, typically, when a home is having its doors replaced, the replacement doors are available and/or delivered in already preformed or assembled forms. It is possible to purchase customized doors from specialized suppliers which will fabricate the door in their own workshop and deliver the product in assembled form, often with a preformed or semi-assembled frame ready to be installed in an opening in a structure. Furthermore, customizations normally involve preparation based on the custom size, depth or other parameters of the opening and rarely involve the mixing and matching of different components to provide unique door design as per the customer's specification.

As an example, U.S. Pat. No. 5,128,807 discloses a wooden door assembly having a wooden composite subframe and an insulative foam core encapsulated therein. However, the disclosed door is assembled from numerous members that are irreversibly put together and do not provide the convenience of allowing disassembly of the door after assembly.

For those disadvantages, there is still a need in the field of building material for ways of connecting members (parts) in a releasable manner.

There is still a need in the field of building materials for door assembly kits.

SUMMARY

According to an embodiment, there is provided a key for releasably connecting a first and second member which comprises:
 a substantially elongated body to releasably connect the first and second member, the body having
  a first mating connector on a first end for releasably connecting to a corresponding mating connector on the first member; and
  a second mating connector on a diametrically opposed second end, for releasably connecting to a corresponding mating connector on the second member.

The key may further comprise a third mating connector on a third end in between said opposed first and second ends for releasably connecting to a corresponding mating connector on a third member.

The key may further comprises a fourth mating connector on a diametrically opposed fourth end, for releasably connecting to a corresponding mating connector on a fourth member.

The key may be for a machineless, adhesiveless, and/or fastenerless releasable connecting of the first and second member.

The key may be made from a more resilient material than the material of the first and second members.

According to another embodiment, there is provided a furniture assembly comprising
 at least a first and second member having mating connectors; and
 a key having a substantially elongated body to releasably connect the first and second member, the body having
  a first mating connector on a first end for releasably connecting to a corresponding mating connector on the first member; and
  a second mating connector on a diametrically opposed second end, for releasably connecting to a corresponding mating connector on the second member.

The body may further have a third mating connector on a third end in between said opposed first and second ends for releasably connecting to a corresponding mating connector on a fourth member.

The body may further have a fourth mating connector on a diametrically opposed fourth end, for releasably connecting to a corresponding mating connector on a fourth member.

The first member may be a table top.

The second member may be a ground engaging means.

The ground engaging means may be a pedestal, or at least one leg.

According to another embodiment, there is provided a door assembly kit comprising:
 at least one first member comprising
  an interior face and an exterior face; and
  at least one end having a mating connector; and
 at least one second member comprising
  an interior face and an exterior face; and
  at least one end having a mating connector;
 at least one key having a substantially elongated body to releasably connect the first and second member, the body having
  a first mating connector on a first end for releasably connecting to a corresponding mating connector on the first member; and
  a second mating connector on a diametrically opposed second end, for releasably connecting to a corresponding mating connector on the second member
  wherein the first and second members are releasably connected.

The body may further have a third mating connector on a third end in between said opposed first and second ends for releasably connecting to a corresponding mating connector on a third member.

The body may further have a fourth mating connector on a diametrically opposed fourth end, for releasably connecting to a corresponding mating connector on a fourth member.

Each opposing ends of the second member may comprise a mating connector.

Three or four ends of the second member may comprise a mating connector.

The door assembly kit may further comprise at least one mating connector on another end of the first and second members and the first and second members form a frame assembly.

The frame assembly may be defining a center for receiving a third member.

The door assembly kit may further comprise a third member comprising
- an interior face and an exterior face; and
- at least one end for receiving a corresponding mating connector of a key, wherein the key has another mating connector for releasably connecting to a mating connector on an adjacent first and second member.

Two, three or four ends of the third member may comprise a mating connector.

The door assembly kit may further comprise an implement.

The implement may be chosen from a handle, a lock, a sliding lock, and combination thereof.

The first member, second member or third member may further comprise an aperture.

According to another embodiment, there is provided a method to releasably assemble a first and second member comprising:
- releasably connecting the first and second member with a key comprising:
  - a substantially elongated body having
    - a first mating connector on a first end for releasably connecting to a corresponding mating connector on the first member; and
    - a second mating connector on a diametrically opposed second end, for releasably connecting to a corresponding mating connector on the second member.

The key may be for releasably connecting the first and second member by a person in a non-manufacturing facility.

The releasably connecting may be performed without a machine, an adhesive, and/or a fastener.

The body may further have a third mating connector on a third end in between said opposed first and second ends for releasably connecting to a corresponding mating connector on a third member.

The body may further have a fourth mating connector on a diametrically opposed fourth end, for releasably connecting to a corresponding mating connector on a fourth member.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 18 illustrates a perspective view of another portion of a door assembly according to the present invention.

FIG. 19 illustrates a front view of the portion of the door assembly of FIG. 18 according to the present invention.

FIG. 20 illustrates a side view of the portion of the door assembly of FIG. 18 according to the present invention.

It will be noted that throughout the appended drawings, like features are identified by like reference numerals.

DETAILED DESCRIPTION OF THE PREFERRED EMBODIMENTS

In embodiments there are disclosed building materials. More particularly, the embodiments relates to a key for releasably connecting members at a right angle, to door assembly kits and door and frame assembly kits. The door assembly kits of the present invention may be comprised of at least two members which are joined together through a mating connector. Preferably, the members may be rectangular, but they may also be square in shape. They may also be of shapes different than rectangular and square.

Figure 6:
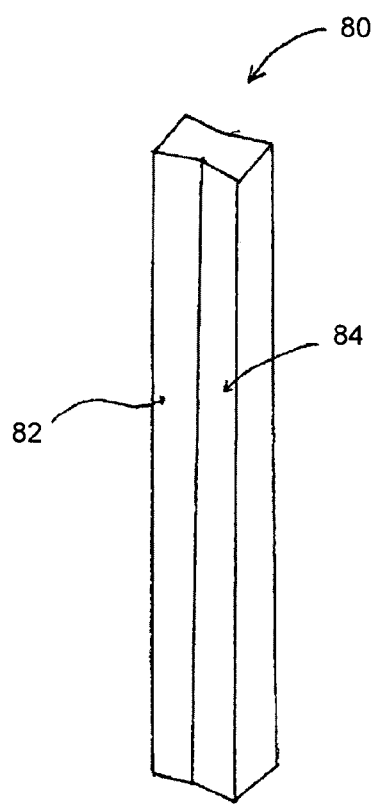
FIG. 6 illustrates a perspective view of a key according to the present invention.
Figure 7:
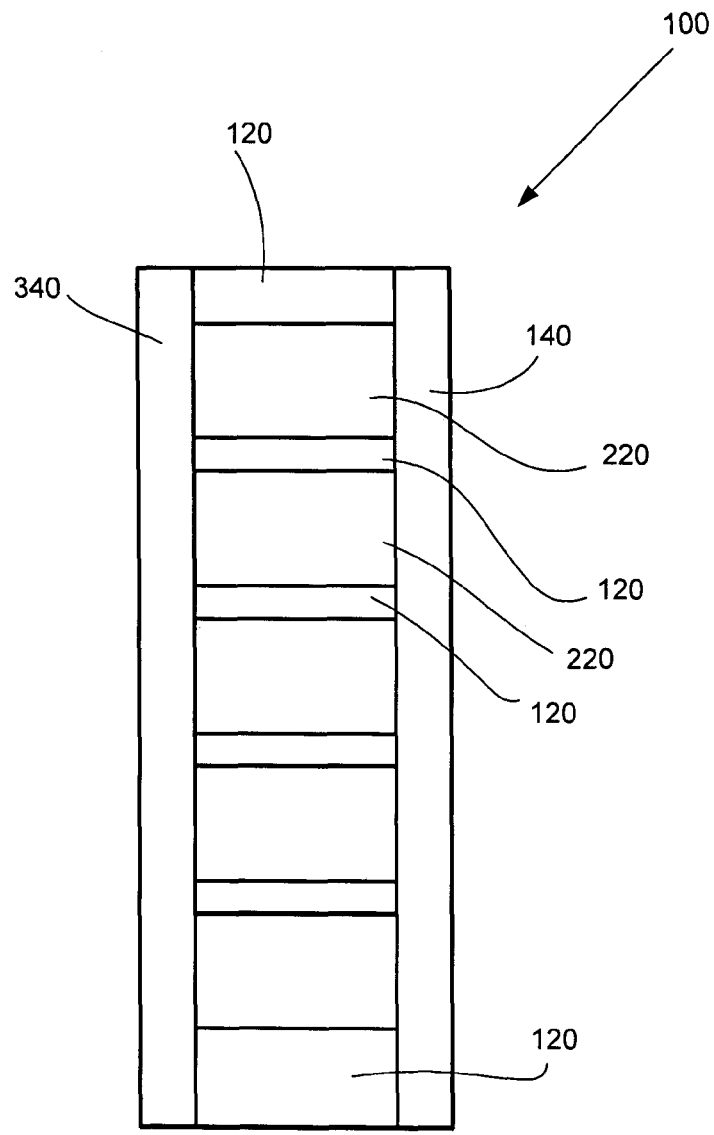
FIG. 7 illustrates a front view of another embodiment of a door assembly according to the present invention.
Figure 8:
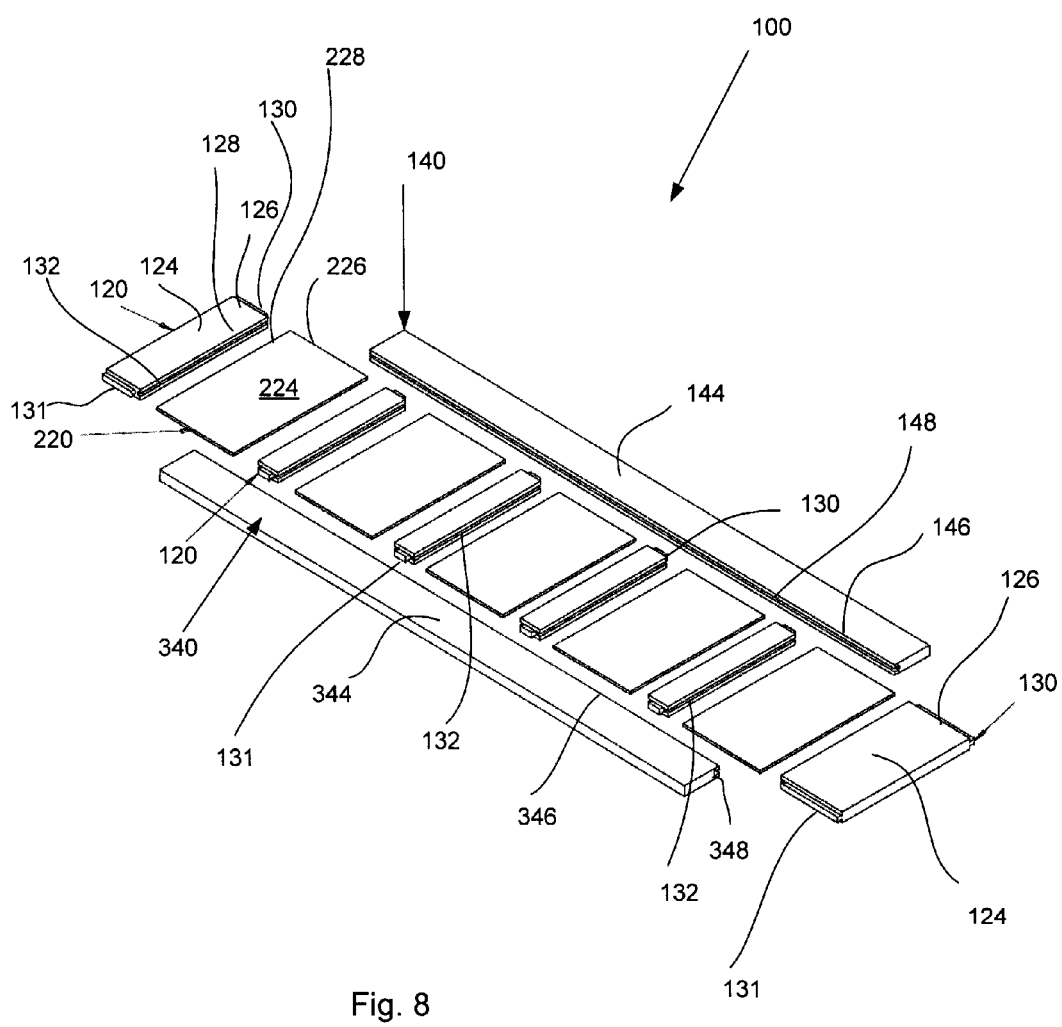
FIG. 8 illustrates an exploded perspective view of another embodiment of a door assembly according to the present invention.
Figure 9:
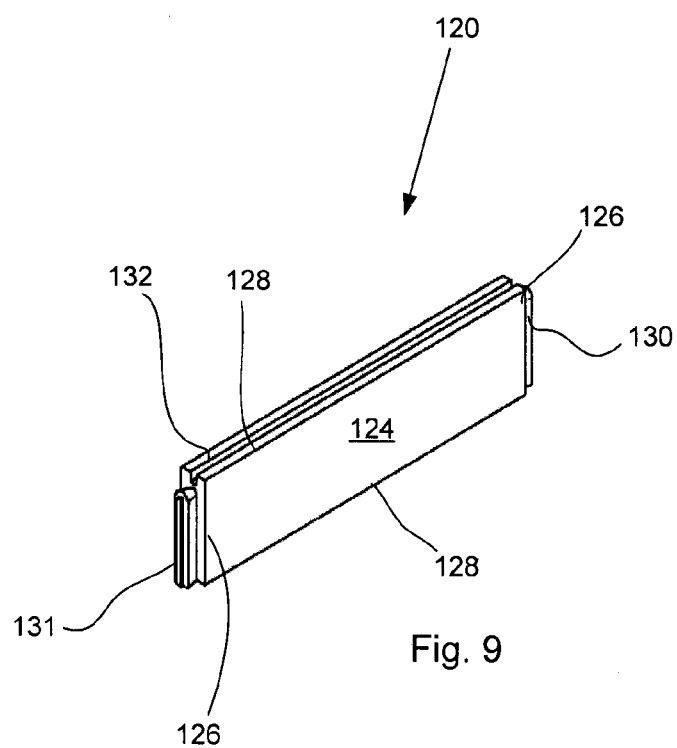
FIG. 9 illustrates a perspective view of another embodiment of a key of a door assembly according to the present invention.
Figure 10:
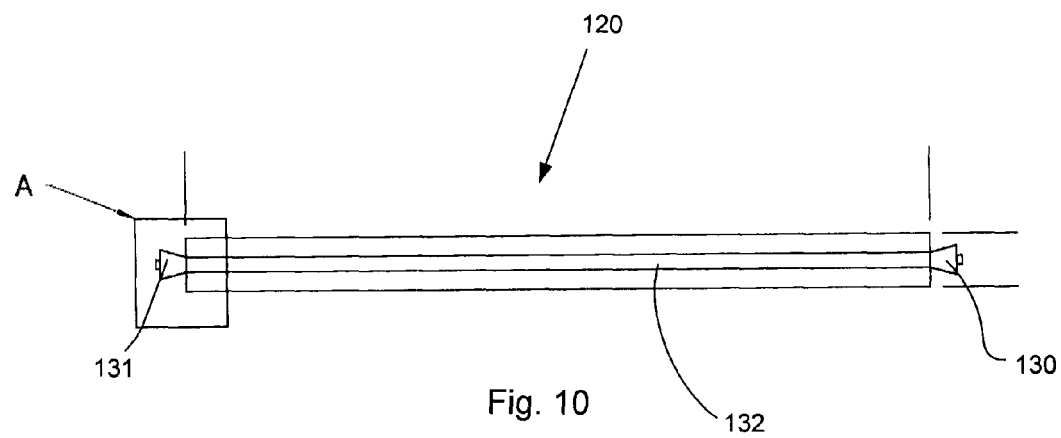
FIG. 10 illustrates a top view of the key of the door assembly of FIG. 9.
Figure 11:
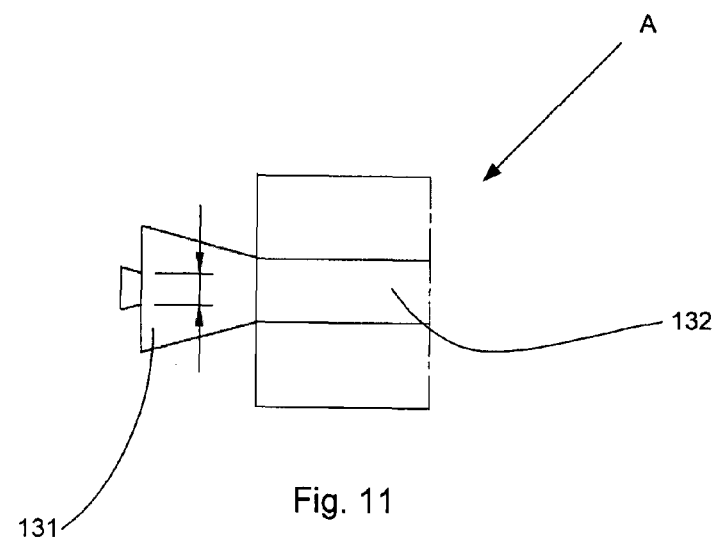
FIG. 11 illustrates a detailed view (A) of a mating connector of the key of the door assembly of FIG. 10 according to the present invention.
Figure 12:
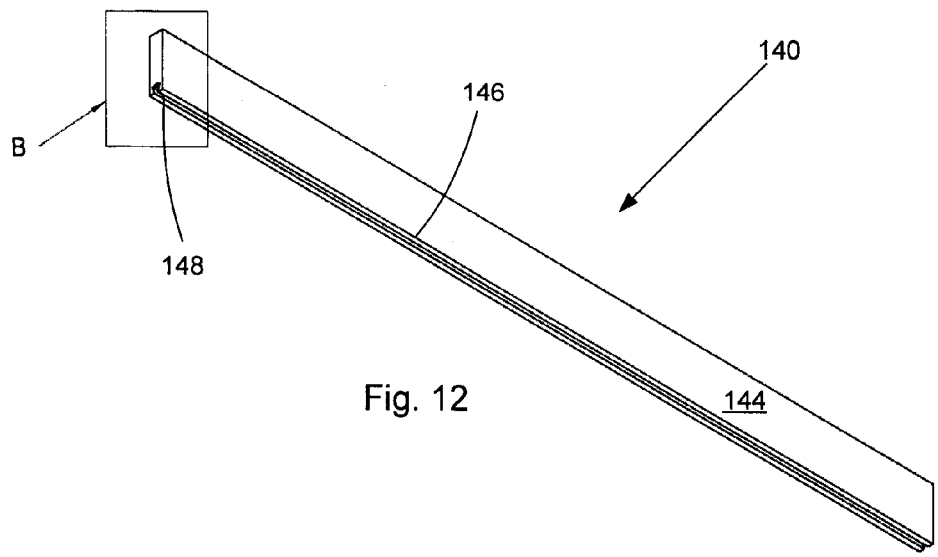
FIG. 12 illustrates a perspective view of another portion of a door assembly according to the present invention.
Figure 13:
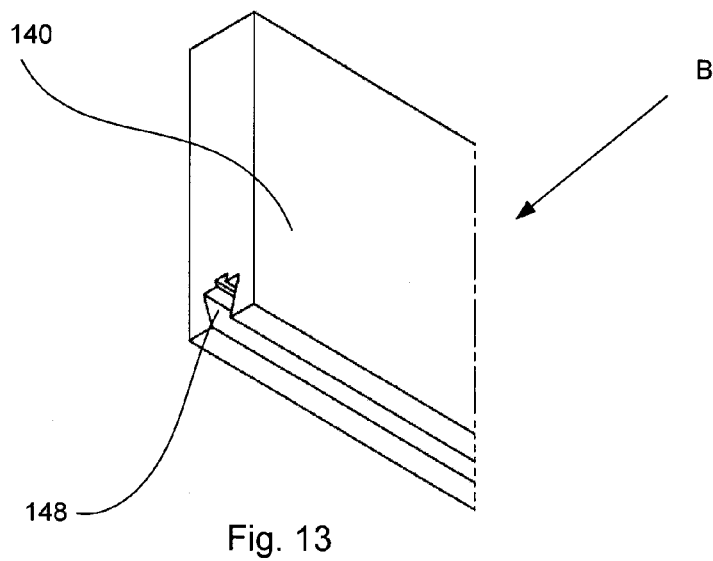
FIG. 13 illustrates a detailed view (B) of a mating connector of the portion of the door assembly of FIG. 12 according to the present invention.
Figure 14:
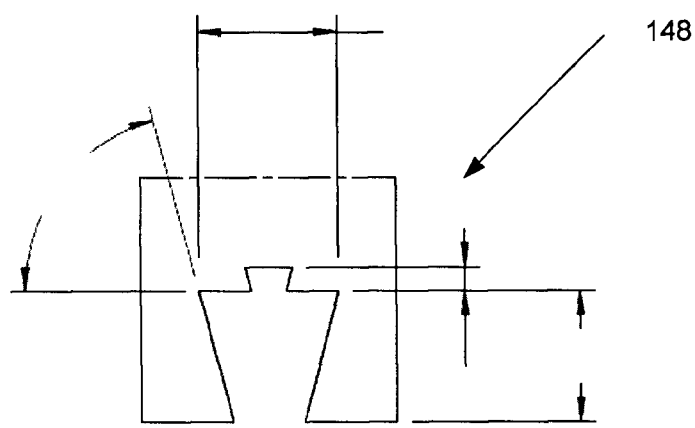
FIG. 14 illustrates a front view of a mating connector of the portion of the door assembly of FIG. 12 according to the present invention.
Figure 15:
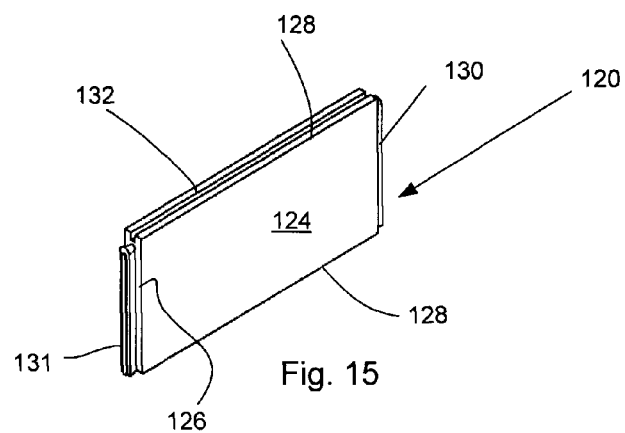
FIG. 15 illustrates a perspective view of another embodiment of a key of a door assembly according to the present invention.
Figure 16:
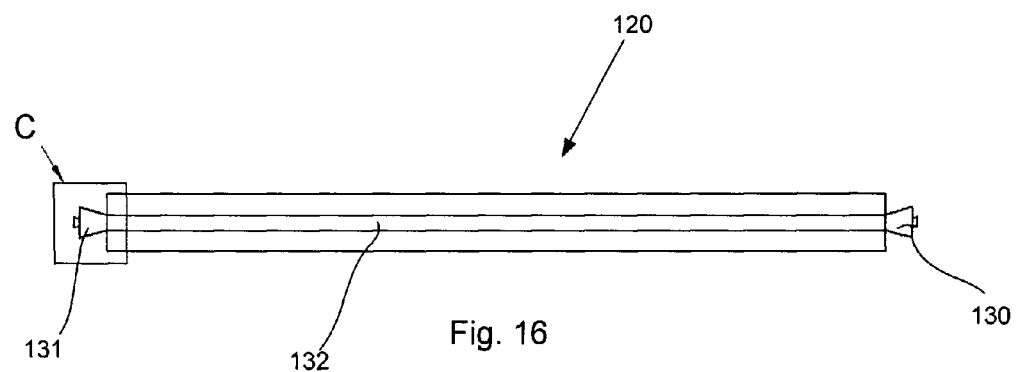
FIG. 16 illustrates a top view of the key of the door assembly of FIG. 15 according to the present invention.
Figure 17:
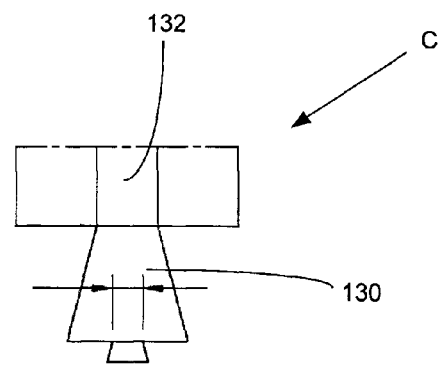
FIG. 17 illustrates a detailed view (C) of a mating connector of the key of the door assembly of FIG. 16 according to the present invention.
Figure 21:
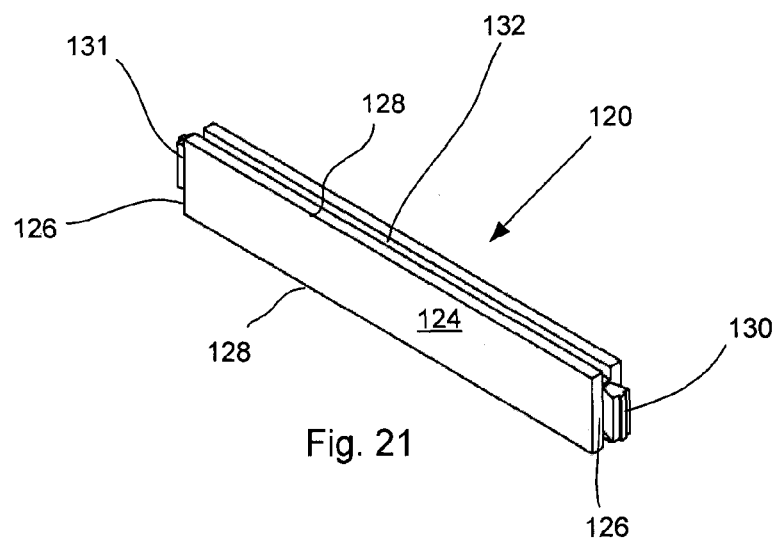
FIG. 21 illustrates a perspective view of another embodiment of a key of a door assembly according to the present invention.
Figure 22:
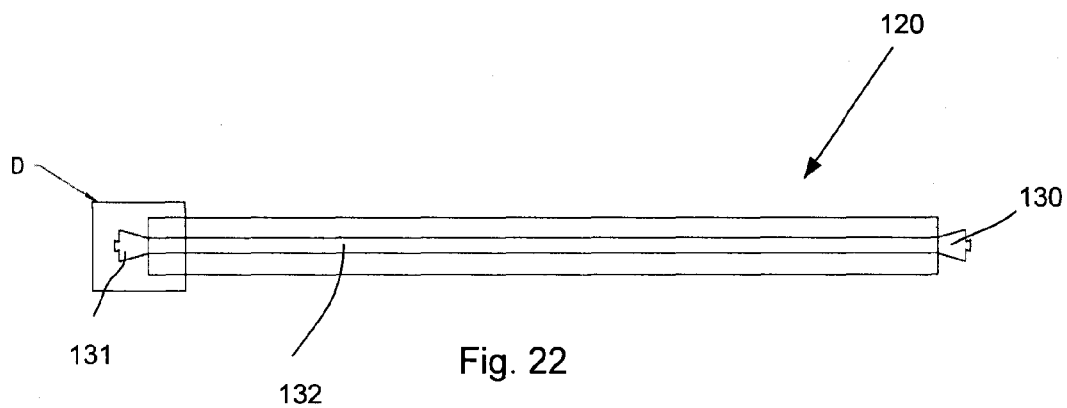
FIG. 22 illustrates a top view of the key of the door assembly of FIG. 21 according to the present invention.
Figure 23:
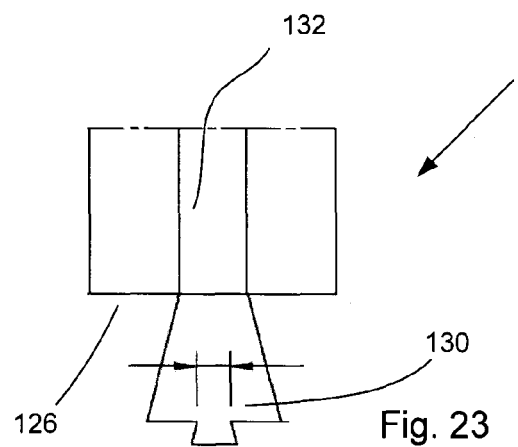
FIG. 23 illustrates a detailed view (D) of a mating connector of the key of the door assembly of FIG. 22 according to the present invention.

Referring now to the drawings, and more particularly to FIG. 6, there is shown an embodiment of a key, referred to as numeral 80, which may be used to releasably connect members at a right angle. The key may be used for releasably connecting members or parts of any type of furniture or door. The key 80 comprises a substantially elongated body having a first mating connector 82 is formed on one end and a second mating connector 84 is formed on another, diametrically opposed end. The mating connectors of the key may be used to releasably connect to corresponding mating connectors on first and second members and connect them at a right angle. The key 80 may be formed integrally as a single piece from one material, for example wood, metal or plastic, or according to another embodiment, it may be formed through the coupling of identical or different mating connectors. The key 80 may be of any suitable shape or form for releasably connecting members. It may also be of any suitable size or dimension, so that it may be used to releasably connect members of different sizes. According to one embodiment of the present invention, the key 80 may be used to connect members in a machineless, adhesiveless and/or fastenerless manner. Preferably, the key 80 is made from a material of a similar hardness or that is more resilient than the material of the first and second member. For example, the material of the key 80 and the first and second member could be the same wood, or a MDF material with similar characteristics. Most preferably, the key 80 is made from a material that is more resilient than the material of the members, such that when it is inserted in the respective mating connectors of the members, it may compress and form a tight fit between the mating connectors of the key and the members. For example, the key 80 could be prepared from pine wood, and the members could be prepared from oak.

According to another embodiment of the present invention, there is disclosed a furniture assembly which comprises first and second members having mating connectors, and at least one key 80 as described above. For example, the first member may be a table top or the likes, and the second member may be a ground engaging means such as pedestal, or one or more legs, to complete a table assembly. The key according to the present invention is used to releasably connect the table top and the pedestal or legs in a strong and firm manner, but nevertheless a releasable manner.

Figure 1:
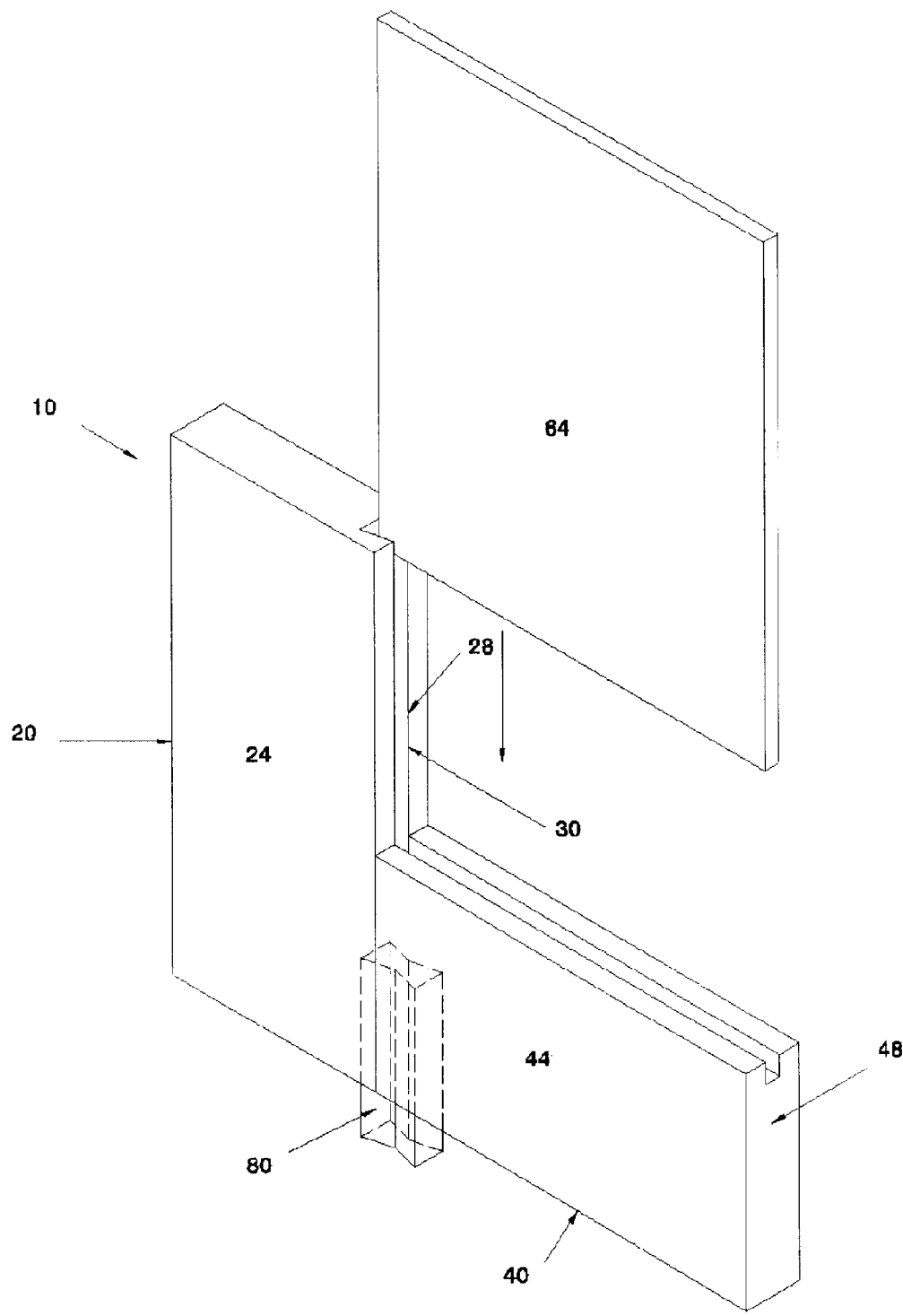
FIG. 1 illustrates a perspective view of one embodiment of a portion of a door assembly according to the present invention.

Referring now to the drawings, and more particularly to FIG. 1, there is shown an embodiment of a door assembly kit, generally referred to as numeral 10, and has one or more first member 20 comprising an interior face 22 (not shown) and an exterior face 24; and first and second ends 26 and 28. First and second ends 26 (not shown) or 28 have a mating connector 30. Other ends of the first member may also have a mating connector. According to another embodiment of the present invention, two or three ends of the first member 20 may have a mating connector.

Figure 2:
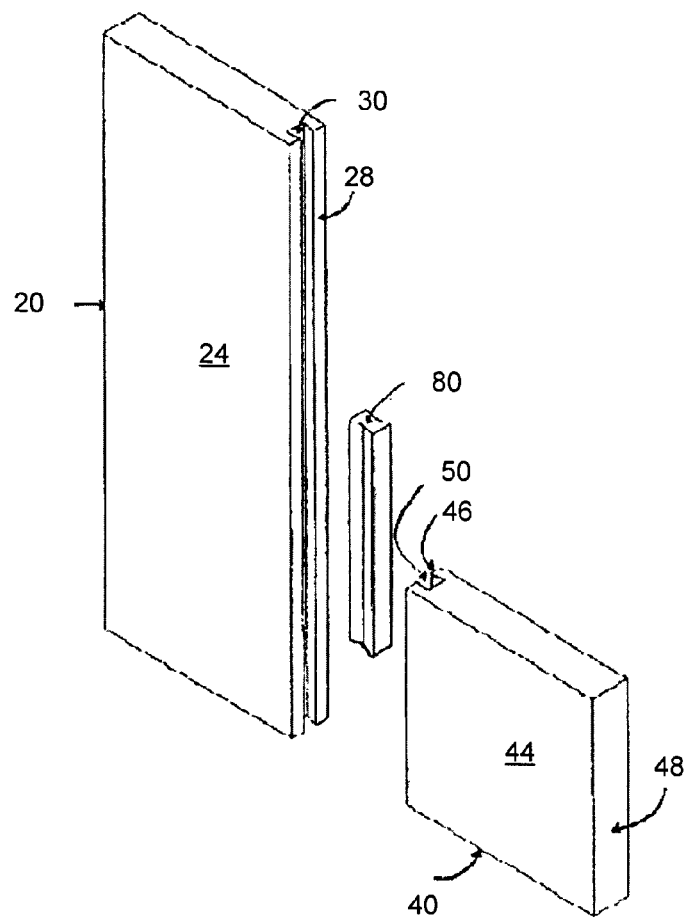
FIG. 2 illustrates an exploded perspective view of one embodiment of a portion of a door assembly according to the present invention.
Figure 5A:
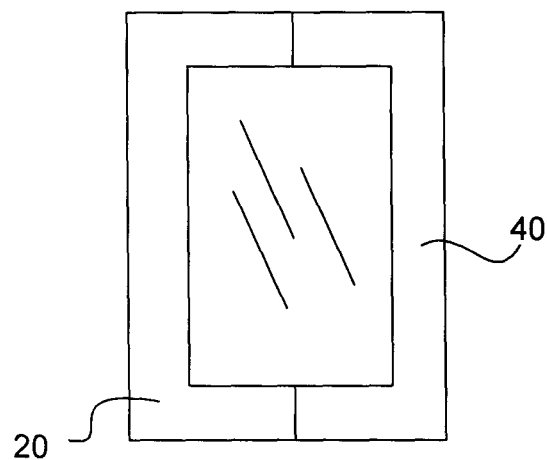
FIG. 5A illustrates a front view of one embodiment of a door assembly forming a frame assembly according to the present invention.
Figure 5B:
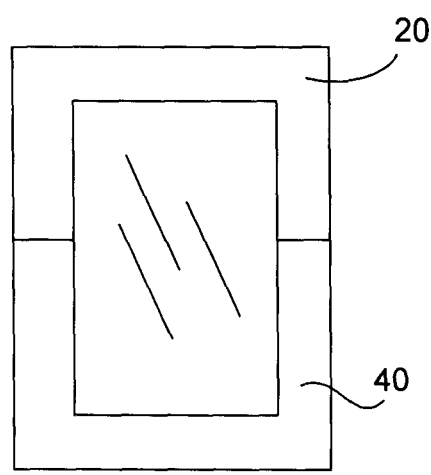
FIG. 5B illustrates a front view of one embodiment of a door assembly forming a frame assembly according to the present invention.

The door assembly kit also has one or more second member 40, also having an interior face 42 (not shown) and an exterior face 44; and two ends 46 and 48. At least one of the ends has a mating connector 50 (FIG. 2). The door assembly kit also comprises at least one key 80 as described above. They key's first and second mating connectors 82 and 84 (FIG. 6) may be inserted in the corresponding mating connectors 30 and 50, for releasably connecting the first member 20 to the second member 40 at a right angle, or to a mating connector on another second member, for example. Other ends of the second member may also have a mating connector. According to one embodiment of the present invention, the first and second ends 46 and 48 of the second member, which are opposite one another, may each have a mating connector 50 (see FIG. 2). According to another embodiment of the present invention, two or three ends of the second member 40 may have a mating connector. According to yet another embodiment of the present invention, four ends of the second member 40 may comprise mating connector. As shown in FIGS. 5A and B, according to another embodiment of the present invention, another end of the first and second members 20 and 40 may comprise another mating connector, and the first and second members 20 and 40 may form a frame assembly. The frame assembly defines a center where a third member may be inserted to complete an assembled door, or according to other embodiments, the center may also receive windows, glass panels, or panels of other materials such as Plexiglas™ or other plastic material, sheet screening and trellis.

Figure 3:
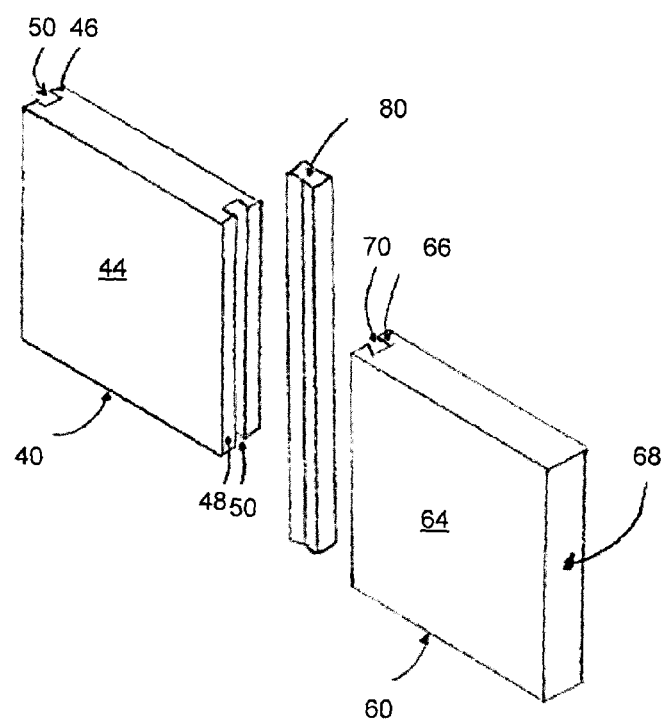
FIG. 3 illustrates an exploded perspective view of one embodiment of a portion of a door assembly according to the present invention.

Now referring to FIG. 3, according to another embodiment of the present invention, the door assembly kit may further include a third member 60 comprising an interior face 62 (not shown) and an exterior face 64 and first and second ends 66 and 68. At least one of the end (e.g. end 66) may have a mating connector 70 for receiving a corresponding mating connector 82 (or 84) of a key 80, which may be connected through the remaining mating connector 82 (or 84) to a mating connector 50 on the second member or a mating connector 40 on a first member 20 for releasably connecting the third member 60 to the adjacent first and second member(s) 20 and 40, respectively. Furthermore, when more than one third member 60 are coupled to second members 40 (in a columnar fashion), the superimposed third members 60 may also be joined to each other through mating connectors 70 present on their ends and a sufficient number of keys 80, as appropriate to complete the door. According to another embodiment of the present invention, two or three ends of the third member 60 may have a mating connector. According to yet another embodiment of the present invention, four ends of the third member 60 may comprise mating connector.

According to another embodiment of the present invention, any one of the first, second or third member 20, 40 or 60 may further have an aperture therein. The aperture may receive other wood panels, windows, glass panels, or panels of other materials such as plexiglass or other plastic material, sheet screening and trelis.

Any one of the second and third member may receive implements such as for example door handle, locks, sliding lock, and combinations thereof.

Figure 4:
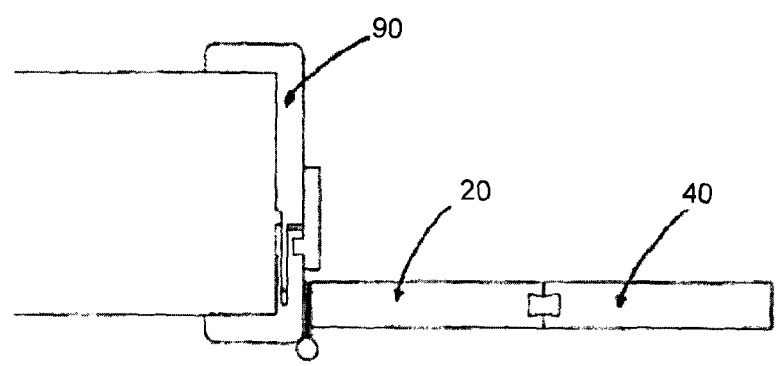
FIG. 4 illustrates a cross-sectional view of one embodiment of a door assembly with a frame assembly according to the present invention.

Now referring to FIG. 4, according to one embodiment of the present invention, the door assembly may be hingely connected to a decorative frame assembly 90 which may be installed around an opening in a structure. The frame assembly 90 may be any conventional frame, and/or frames made from several portions and framing an opening in a structure.

According to another embodiment, there is disclosed a method to releasably assemble a first and second member at a right angle by releasably connecting the first and second member 30, 40 with a key 80 as described above. The key comprises a substantially elongated body having a first mating connector 82 on one end, for releasably connecting to a corresponding mating connector 30 on a first member 20; and a second mating connector 84 on a diametrically opposed end, for releasably connecting to a corresponding mating connector 50 on a second member 40. Upon assembly, the first and second member 30, 40 are connected at a right angle.

According to an embodiment of the present invention, key 80 may be used for releasably connecting members (e.g. first and second members 20, 40) by a person in a non-manufacturing facility, such as a household setting. According to yet another embodiment, the releasable connection between the members is performed without a machine, an adhesive, and/or a fastener.

In use, one may first select one or more first members. The selection may be according to predetermined decorative properties (e.g. wood grain or essence, varnish, paint color, design, engraving, embossing, etc), or physical properties (sturdiness, thickness, material (e.g. wood, metal, etc), or any properties desired. The first member, or combinations thereof may be sized and shaped according to standard door sizes. Secondly, one or more second members may be selected, again according to any of the desired properties. The second members or combinations thereof may also be sized and shaped according to standard door sizes. The second members may be compatible in size and shape with the first members so that a door is obtained once the members are assembled. According to another embodiment of the present invention, the second member(s) may also be of sizes, shapes and designs that allow intervening gaps in one or more portion of the door once assembly is complete. For example, one or more gaps could be filed in with glass panes (e.g. a window), wooden panes with identical or different finish or design, or the likes. Thirdly, one or more third members may be selected, again according to any of the desired properties. The third members or combinations thereof may also be sized and shaped according to standard door sizes so that a door is obtained once the members are assembled. The third members may be compatible in size and shape with the second members so that a door is obtained once the members are assembled.

In use, one may select the desired members by mixing and matching according to a desired pattern from pre-prepared or customized prepared members and create their own customized door assembly kit. According to another embodiment of the present invention, the door assembly kit may be purchased as a prepackaged unassembled door kit with members preselected according to a common or popular design. The members, or unassembled door assembly kit of the present invention may be purchased separately and conveniently carried in regular vehicle, forgoing the need of heavier or larger transportation that is normally required for delivery of fully assembled doors with or without attendant frames.

The door assembly kit of the present invention may be assembled by the purchaser with the use of a rubber mallet that is used to drive the provided keys and insert them in the mating connectors of the members, so as to create an assembled door therefrom. Furthermore, should a need arise to replace or change a member of the door, or an element of the assembled door such as a glass panel, the rubber mallet may be used to disassemble the door and perform a change or replacement.

Referring now more particularly to FIGS. 7, 8 and 9 to 23, there is shown another embodiment of a door assembly kit, generally referred to as numeral 100. The door assembly kit 100 has one or more key 120 comprising an interior face (not shown) and an exterior face 124; and first and second ends 126 and third and fourth 128. At least one first or second end 126 has a first mating connector 130. The other first or second end 126 of the key 120 may also have a second mating connector 131. Moreover, at least one third our fourth 128 has a third mating connector 132. The other ends 128 of the key 120 may also have a fourth mating connector (not shown).

The door assembly kit 100 also has third and fourth members 220, also having an interior face (not shown) and an exterior face 224 and first and second ends 226 and third and fourth 228. In accordance with this embodiment, the two ends 226 and the two ends 228 are configured without mating connector. On the other hand, at least one end 226 and/or one end 228 may be configured to receive mating connectors (not shown).

The door assembly kit 100 also has a first member 140 and a second member 340, also having interior faces (not shown) and an exterior faces 144, 344 and ends 146, 346. At least one end 146 of the first member 140 has a mating connector 148. At least one end 346 of the second member 340 has a mating connector 348.

The first mating connectors 130 of the key 120 may be inserted in the corresponding mating connector 148 of the first member 140, for releasably connecting the first member 140 to the key 120. Moreover, the ends 226 and ends 228 of the third member 220 may be inserted respectively in the corresponding third mating connector 132 and fourth mating connector 133 of the key 120 and in the mating connector 348 of the second member 340.

According to an embodiment of the present invention, the ends 126 and 128 of the key 120, which are opposite one another (first and second ends 126 and third and fourth ends 128 are opposed to each other), may have respectively a first mating connector 130 and a second mating connector 131 and a third mating connector 132 and a fourth mating connector 133.

According to another embodiment of the present invention, any one of the key 120, the first member 140, the second member 340 or the third member 220 may further have an aperture therein. The aperture may receive other wood panels, windows, glass panels, or panels of other materials such as plexiglass or other plastic material, sheet screening and trellis.

Moreover, according to another embodiment of the present invention, the third and fourth members 220 may be made of any one of wood panels, windows, glass panels, or panels of other materials such as plexiglass or other plastic material, sheet screening and trellis.

Additionally, any one of the key 120, the first member 140, the second member 340 or the third member 220 may receive implements such as for example door handle, locks sliding lock, and combination thereof.

According to another embodiment, there is disclosed a method to releasably assemble a key 120, a first member 140, a second member 340 and a third member 220 by releasably connecting the first mating connector 130 of the key 120 with the mating connector 148 of the first member 140 and by releasably connecting the second mating connector 131 of the key 120 with the mating connector 348 of the second member 340, and by releasably connecting an third and fourth ends 228 of the third member 220 with the corresponding third mating connector 132 of the key member 120.

According to an embodiment of the present invention, the door assembly kit 100 and method may be used for releasably connecting the keys 120, the first member 140, the second member 340 and the third and fourth members 220 by a person in a non-manufacturing facility, such as a household setting. According to yet another embodiment, the releasable connection between the keys 120, the first member 140, the second member 340 and third and fourth members 220 may be performed without a machine, an adhesive, and/or a fastener.

In use, one may first select one or more keys 120, first members 140, second members 340 and third and fourth members 220. The selection may be according to predetermined decorative properties (e.g. wood grain or essence, varnish, paint color, design, engraving, embossing, etc.), or by physical properties (sturdiness, thickness, material (e.g. wood, metal, etc.)), or any properties desired. The key 120 or combination thereof may be sized and shaped according to standard door sizes. Secondly, one or more first member 140 and second member 340 may be selected, again according to any of the desired properties. The first and second members 140 and 340 may also by sized and shaped according to standard door sizes. The key 120 may be compatible in size and shape with the first and second members 140 and 340 so that a door is obtained once the keys 120, the first members 140, the second members 340 and the third and fourth members 220 are assembled. According to another embodiment of the present invention, the third member and or third and fourth member(s) 220 may also be of sizes, shapes and designs that allow intervening gaps in one or more portion of the door once assembly is complete. For example, one or more gaps could be filed in with glass panes (e.g. a window), wooden panes with identical or different finish or design, or the likes. Also, a third and fourth members 220 may be selected, again according to any of the desired properties. The third and fourth members 220 or combinations thereof may also be sized and shaped according to standard door sizes so that a door is obtained once the key 120, the first member 140, the second member 340 and the third member 220 are assembled. The third and fourth members 220 may be compatible in size and shape with the first and second members 140 and 340 so that a door is obtained once the first, second and third and fourth members 140, 340 and 220 are assembled with the keys 120.

In use, one may select the desired keys and members (120, 140, 340 and 220) by mixing and matching according to a desired pattern from pre-prepared or customized prepared members and create their own customized door assembly kit 100. According to another embodiment of the present invention, the door assembly kit 100 may be purchased as a pre-packaged unassembled door kit with the keys, first, second and third and fourth members 120, 140, 340 and 220 preselected according to a common or popular design. The key 120, the first members 140, the second members 340 and the third and fourth members 220, or unassembled door assembly kit 100 of the present invention may be purchased separately and conveniently carried in regular vehicle, foregoing the need of heavier or larger transportation that is normally required for delivery of fully assembled doors with or without attendant frames.

The door assembly kit 100 of the present invention may be assembled by the purchaser with the use of a rubber mallet that is used to drive the provided mating connectors and insert them in the corresponding mating connectors of the keys 120, the first member 140 and the second members 340, so as to create an assembled door therefrom. Furthermore, should a need arise to replace or change a key 120, a first member 140, a second member 340 or a third member 220 of the door, or an element of the assembled door such as a glass panel, the rubber mallet may be used to disassemble the door and perform a change or replacement.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A door assembly comprising:
   at least a first door member having a first internal surface, a first external surface opposite to said first internal surface and a first longitudinal internal groove along a first internal surface length defined by said first internal surface and a second door member having a second internal surface, a second external surface opposite to said second internal surface and a second longitudinal internal groove along a second internal surface length defined by said second internal surface, said first door member defining a first longitudinal axis, said second door member defining a second longitudinal axis distant from said first longitudinal axis;
   at least two substantially elongated panel bodies, each one of said at least two substantially elongated panel bodies defining a third external surface and a third longitudinal axis, each one of said at least two substantially elongated panel bodies being slidably and releasably connected with said first and second door members, each one of said at least two substantially elongated panel bodies having:
      a first mating connector on a first end slidably and releasably connected to said first longitudinal internal groove on said first door member when said first mating connector is slidably engaged with said first longitudinal internal groove; and
      a second mating connector on a diametrically opposed second end slidably and releasably connected to said second longitudinal internal groove on said second door member when said second mating connector is slidably engaged with said second longitudinal internal groove, said first mating connector defining a first mating connector width, said second mating connector defining a second mating connector width, said first longitudinal internal groove defining a first groove access width and said second longitudinal internal groove defining a second groove access width, wherein said first mating connector width and said second mating connector width are respectively longer than said first groove access width and said second groove access width, thereby providing a slidable and releasable connection with the first and second longitudinal internal grooves; and
   another panel body defining a panel first end and a panel second end, said another panel body having a first panel mating connector on said panel first end releasably connected to said first longitudinal internal groove on said first door member and a second panel mating connector on said panel second end releasably connected to said second longitudinal internal groove on said second door member;
   wherein each third longitudinal axis of said at least two substantially elongated panel bodies is perpendicular to said first longitudinal axis of said first door member and perpendicular to said second longitudinal axis of said second door member; and wherein said first external surface of said first door member, said second external surface of said second door member and each third external surface of said at least two substantially elongated panel body define an external peripheral surface of said door assembly, the external peripheral surface being free of longitudinal mating connectors.

2. The door assembly according to claim 1, wherein each one of said at least two substantially elongated panel bodies further comprises a third mating connector on a third end in between said opposed first and second ends releasably connected to a corresponding third panel mating connector on the another panel body, said another panel body defining a fourth longitudinal axis parallel to said third longitudinal axis of each one of said at least two substantially elongated panel bodies.

3. The door assembly according to claim 2, wherein said at least two substantially elongated panel bodies comprises more than two substantially elongated panel bodies and further wherein at least one of said more than two substantially elongated panel bodies further comprises a fourth mating connector on a diametrically opposed fourth end releasably connected to a corresponding fourth panel mating connector on the another panel body.

4. A door assembly kit comprising:
    a first door member comprising:
        a first internal surface defining a first internal surface length;
        a first external surface opposite to said first internal surface; and
        a first longitudinal internal groove along said first internal surface length; and
    a second door member comprising:
        a second internal surface defining a second internal surface length;
        a second external surface opposite to said second internal surface; and
        a second longitudinal internal groove along said second internal surface length;
    at least two substantially elongated panel bodies, each one of said at least two substantially elongated panel bodies defining a third external surface and a third longitudinal axis, each one of said at least two substantially elongated panel bodies to slidably and releasably connect said first and second door members, each one of said at least two substantially elongated panel bodies having:
        a first mating connector on a first end for slidably and releasably connecting to said first longitudinal internal groove on said first door member when said first mating connector is slidably engaged with said first longitudinal internal groove, said first door member defining a first longitudinal axis; and
        a second mating connector on a diametrically opposed second end for slidably and releasably connecting to said second longitudinal internal groove on said second door member when said second mating connector is slidably engaged with said second longitudinal internal groove, said first mating connector defining a first mating connector width, said second mating connector defining a second mating connector width, said first longitudinal internal groove defining a first groove access width and said second longitudinal internal groove defining a second groove access width, wherein said first mating connector width and said second mating connector width are respectively longer than said first groove access width and said second groove access width, thereby providing a slidable and releasable connection with the first and second longitudinal internal grooves, said second door member defining a second longitudinal axis;
    another panel body defining a panel first end and a panel second end, said another Panel body having a first panel mating connector on said panel first end for releasably connecting to said first longitudinal internal groove on said first door member and a second panel mating connector on said panel second end for releasably connecting to said second longitudinal internal groove on said second door member,
    wherein said first and second door members are to be releasably connected by said at least two substantially elongated panel bodies and further wherein each third longitudinal axis of said at least two substantially elongated panel bodies is perpendicular to said first longitudinal axis of said first door member and perpendicular to said second longitudinal axis of said second door member and further wherein said first external surface of said first door member, said second external surface of said second door member and each third external surface of said at least two substantially elongated panel bodies defines an external periphery of said door panel once releasably connected, the external periphery being free of longitudinal mating connectors.

5. The door assembly kit as claimed in claim 4, wherein said at least two substantially elongated panel bodies further comprise a third mating connector on a third end in between said opposed first and second ends for releasably connecting to a corresponding third panel mating connector on said another panel body.

6. The door assembly kit as claimed in claim 4, wherein said at least two substantially elongated panel bodies comprises a plurality of substantially elongated panel bodies and further wherein at least one of said plurality of substantially elongated panel bodies further comprises a fourth mating connector on a diametrically opposed fourth end for releasably connecting to a corresponding fourth panel mating connector on said another panel body.

7. The door assembly kit as claimed in claim 4, wherein said another panel body comprises the first panel mating connector, the second panel mating connector, a third panel mating connector and a fourth panel mating connector.

8. The door assembly kit as claimed in claim 4, wherein said another panel body comprises more than two other panel bodies, each one of said more than two other panel bodies comprising:
    an interior face and an exterior face.

9. The door assembly kit according to claim 4, further comprising a door implement to be releasably connected to one of: said first door member, said second door member, one of said at least two substantially elongated panel bodies and said another panel body.

10. The door assembly kit according to claim 9, wherein said door implement is chosen from a door handle, a door lock, a door sliding lock, or a combination thereof.

11. The door assembly kit according to claim 4, wherein at least one of said first door member, said second door member and said another panel body further comprises a door aperture.

* * * * *